United States Patent [19]
Kim et al.

[11] Patent Number: 5,490,908
[45] Date of Patent: Feb. 13, 1996

[54] ANNEALING AND DESCALING METHOD FOR STAINLESS STEEL

[75] Inventors: Yeong-U Kim, Export; Donald R. Zaremski, Cheswick; Carol S. Hertzler, Monroeville, all of Pa.

[73] Assignee: Allegheny Ludlum Corporation, Pittsburgh, Pa.

[21] Appl. No.: 273,385

[22] Filed: Jul. 11, 1994

[51] Int. Cl.$^6$ ........................................ C25F 1/06
[52] U.S. Cl. ........................ 148/241; 148/567; 205/712
[58] Field of Search ................... 204/145 R, 129.35, 204/141.5, 129.75, 210

[56] References Cited

U.S. PATENT DOCUMENTS

| | | | |
|---|---|---|---|
| 2,902,572 | 9/1959 | Lackner et al. | 219/10.41 |
| 3,444,346 | 5/1969 | Russell et al. | 219/10.79 |
| 4,054,770 | 10/1977 | Jackson et al. | 219/10.6 R |
| 4,363,709 | 12/1982 | Zaremski | 204/145 R |
| 4,415,415 | 12/1983 | Zaremski | 204/141.5 |
| 4,450,058 | 5/1984 | Lovejoy | 204/145 R |
| 4,585,916 | 4/1986 | Rich | 219/10.16 R |
| 4,678,883 | 7/1987 | Saitoh et al. | 219/10.61 R |
| 4,824,536 | 4/1989 | Kim et al. | 204/145 R |
| 4,859,297 | 8/1989 | Kanjii et al. | 204/145 R |
| 4,994,157 | 2/1991 | Itoh et al. | 204/145 R |

*Primary Examiner*—Donald R. Valentine
*Attorney, Agent, or Firm*—Patrick J. Viccaro

[57] ABSTRACT

A method for processing stainless steel strip or sheet provides for cleaning the surface of the stainless steel with a solution selected from the group consisting of water and alkaline-based and acid-based compounds to reduce oxide scale formation and to provide more uniform oxide scale during subsequent annealing by transverse-flux induction heating up to an annealing temperature of about 2300 degrees Fahrenheit and then electrolytically descaling by immersing in an aqueous solution electrolyte of one neutral salt, preferably, sodium sulfate maintained at a temperature in excess of 150 degrees Fahrenheit and with the use of low current density of 0.1 to 1.0 amperes per square inch to descale the steel substantially entirely, and thereafter applying a water rinse combined with wet wiping to the electrolytically-descaled stainless steel.

10 Claims, 7 Drawing Sheets

ANNEALING AND DESCALING METHOD FOR STAINLESS STEEL

BACKGROUND OF THE INVENTION

1. Field of the Invention

The present invention relates to annealing and descaling of stainless steel sheet or strip to obtain synergistically the elimination of subsequent acid pickling, and, more particularly to ensure the formation of a thin uniform oxide scale layer to allow complete removal in low current density electrolyte.

2. Description of the Prior Art

In the manufacture of flat-rolled stainless-steel sheets and strip products, it is necessary to anneal or soften the material, subsequent to the cold-rolling operation. One very common annealing practice involves heating the steel in an oxidizing furnace atmosphere to a temperature that also causes the formation of oxide surface scale. Such heating, to a temperature typically in the range of 1450 degrees Fahrenheit to 2150 degrees Fahrenheit (788 degrees Celsius to 1177 degrees Celsius), depending upon the chemical composition of the steel being processed, is commonly done in a refractory-lined, gas-fired furnace containing an oxidizing atmosphere, and such treatment typically results in the formation on the stainless steel of an oxide scale having a thickness in the range of 4000 Angstroms to several microns. The scale must ultimately be removed before the product is considered ready for sale. To accomplish this, according to the prior art, any of several different descaling processes may be used, alone or in combination, and among these known processes there are (1) shot blasting following by acid pickling, (2) conditioning the scale by immersing the product in molten salt or subjecting it to an electrolytic treatment, followed by acid pickling, and (3) straight acid pickling. The acids commonly used in the pickling operation include sulfuric, nitric, and nitric-hydrofluoric combinations. The use of such acids is disadvantageous and costly, not only because the acids themselves are relatively expensive, but also because they are hazardous materials which necessitate the use of special handling techniques before, during, and after their use; moreover, because of environmental regulations, the disposal of waste pickle liquor presents costly problems.

The prior art also contains U.S. Pat. No. 4,363,709 which discloses the removal of oxide scale from the surface of a metallic body of stainless steel, particularly of the 300 and 400 series, with the use of a high-current-density electrolytic descaling process in a bath consisting of an aqueous solution containing about 15 to 25 weight percent of sodium sulfate, maintained at a temperature of at least 150 degrees Fahrenheit (65.6 degrees Celsius). According to the above-mentioned patent, the stainless steel is subjected as the anode to the action of a direct electric current for at least 10 seconds at a current density of at least 3 amperes per square inch (46.5 Amps/dm$^2$). It was suggested that high chromium ferritic alloys may have to be thoroughly cleaned prior to annealing to avoid thick oxide scales, including chromium oxide.

U.S. Pat. No. 4,415,415 discloses a process for controlling oxide scale formation and descaling stainless steel. The oxide scale is developed in an oxidizing furnace atmosphere of controlled oxygen content and, thereafter, is conditioned electrolytically at a low density electric current of 0.1 up to 1.0 ampere per square inch.

The prior art contains, moreover, a group of patents which are concerned with the problem of providing heat to metal strip or sheet material by means of electrical induction. This prior art includes, for example, the following U.S. Pat. Nos. 4,054,770; 4,585,916; 3,444,346; 2,902,572; and 4,678,883. These patents may be considered as relating to such an electromagnetic induction process called "Transverse Flux Induction Heating", abbreviated "TFIH".

The prior art also contains U.S. Pat. No. 4,824,536 which discloses the processing of cold rolled stainless steel strip or sheet by providing annealing and subsequent descaling of the stainless steel by a combination of induction heating to an annealing temperature ranging up to 2300 degrees Fahrenheit (1260 degrees Celsius) causing the formation on the steel of scale having a thickness of up to 2000 Angstroms. The annealing process is followed by electrolytic descaling at high current density in an aqueous solution of 15 to 25 weight percent of sodium sulfate, maintained at a temperature of at least 150 degrees Fahrenheit (66 degrees Celsius) for a time sufficient to substantially entirely descale the steel. The oxide scale thickness was significantly less than 2000 Angstroms at the completion of the annealing operation, and specifically, was on the order of 700 to 1400 Angstroms and required a current density during the electrolytic descaling of at least 3 amperes per square inch. The induction annealing treatment followed by electrolytic treatment in this manner represented a notable advancement over the typical annealing operation in a gas fired atmosphere where oxidation of the stainless steel sheet or strip is extensive unless special measures are taken to provide an inert or reducing atmosphere during the annealing operation.

It has been found that induction heating produces an oxide scale which is relatively compositionally consistent and uniformly thick. Furthermore, it has been found that such a scale is removed quite effectively by electrolytic treatment. For example, the '536 patent disclosed that thinner scale thicknesses such as 700 angstroms occurred at lower annealing temperatures, such as 1850 degrees Fahrenheit (1010 degrees Celsius) whereas a thicker scale thickness of 1400 angstroms occurred at an annealing temperature of 2057 degrees Fahrenheit (1125 degrees Celsius). The widely varying scale thicknesses impose process variables to the electrolytic treatment that varies significantly as a function of the annealing temperature. Annealing temperatures on the order of 1950–2100 degrees Fahrenheit (1066–1149 degrees Celsius) are used for conventional gas-fired annealing processes.

It is believed that higher annealing temperatures will be needed for TFIH to achieve stainless steel metallurgical time-at-temperature requirements. Such temperatures may range from 1700 degrees Fahrenheit for ferritic and 1900 degrees Fahrenheit for austenitic up to 2300 degrees Fahrenheit, and more likely may range 2000 to 2300 degrees Fahrenheit.

The need therefore exists for a process that will allow scale removal by electrolytic treatment of an induction annealed stainless steel that produces only a thin uniform scale formation but also affects a savings through a materially lower current flux density than the heretofore required flux density of at least 3 amps per square inch. The process of the present invention further seeks to eliminate the need for follow-up acid pickling.

Accordingly, it is an object of the present invention to provide a process for treating stainless steel sheet or strip by initially cleaning the steel surface prior to annealing by transverse flux induction heating.

SUMMARY OF THE PRESENT INVENTION

According to the present invention, there is provided a method of processing cold-rolled stainless steel in the form of a strip or a sheet. The method includes cleaning the surface of the stainless steel with a solution selected from the group consisting of water and aqueous solutions of alkaline or acid-based compounds in amounts sufficient to help reduce oxide scale formation and to render a more uniform scale thickness during subsequent annealing. Annealing is provided by subjecting the stainless steel to transverse-flux electrical-induction heating, substantially uniformly across its width, to an annealing temperature range of up to 2300 degrees Fahrenheit, preferably 1700 to 2300 degrees, thereby producing on the steel an oxide-scale having a relatively uniform thickness of about 1200 Angstroms or less, preferably less than 900 Angstroms, and electrolytically descaling the stainless steel by subjecting it to the action of a bath of an electrolyte of an aqueous solution of at least one neutral salt from the group consisting of the chloride, sulfate, and nitrate of an alkali metal or ammonium maintained at a temperature in excess of 150 degrees Fahrenheit and with the use of current density as low as 0.1 amperes per square inch for a time sufficient to descale the steel substantially entirely.

BRIEF DESCRIPTION OF THE DRAWINGS

These features and advantages of the present invention as well as others will be more fully understood when the following description is read in light of the accompanying drawings in which.

DETAILED DESCRIPTION OF THE PREFERRED EMBODIMENTS

Figure 1:
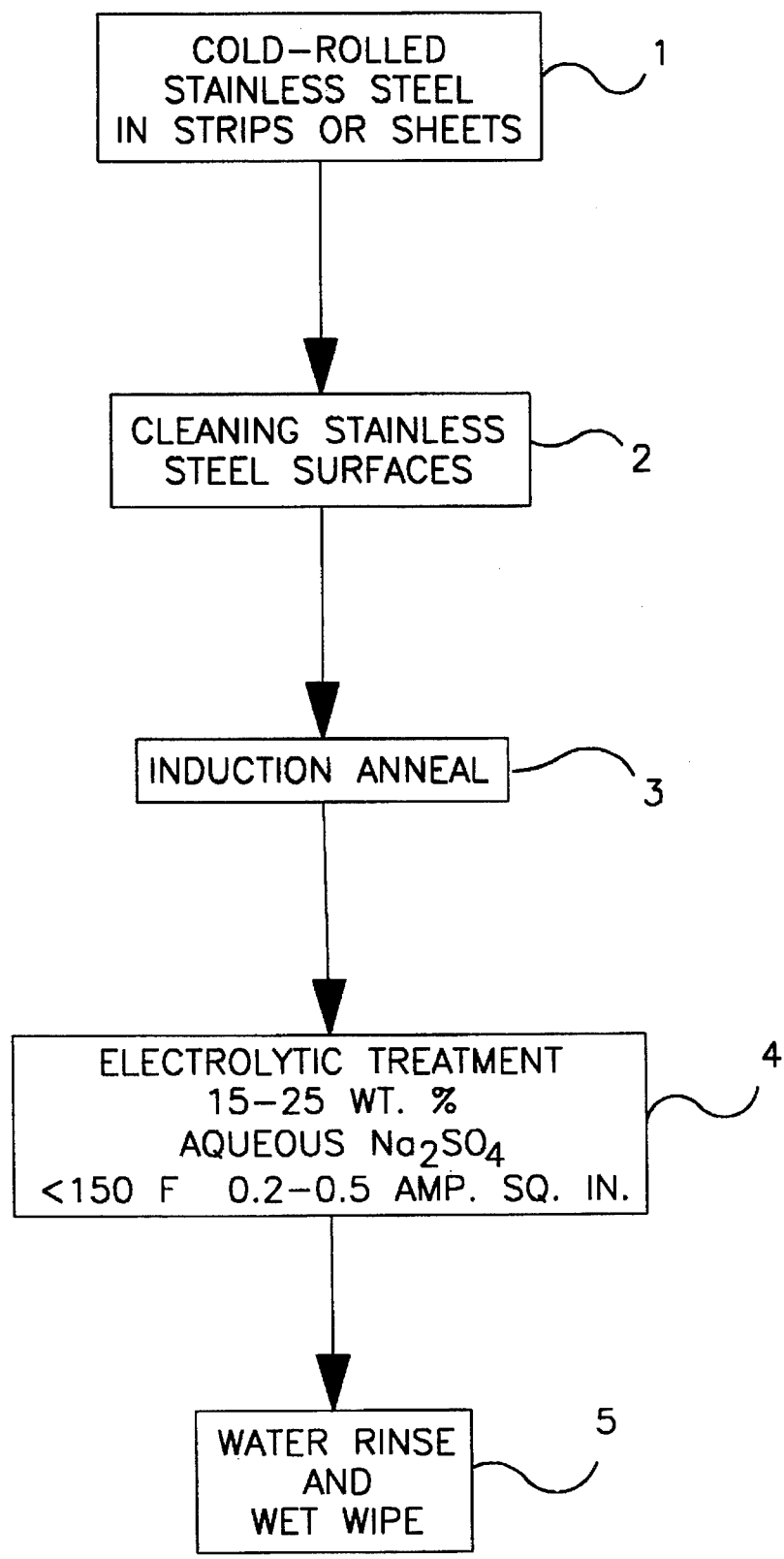
FIG. 1 is a flow diagram of the process according to the present invention.

With reference to FIG. 1, the process according to the present invention is carried out with a stainless steel product which has been processed in a well known manner to provide a cold rolled stainless steel workpiece having the form of a strip or a sheet. Such stainless steel may be ferritic, such as AISI type 430, or austenitic, for example AISI type 304. The sheet or strip received for processing, according to the present invention, has been cold rolled, as indicated in the box identified by reference numeral 1, and will have a thickness chosen to suit the end use of the stainless steel. For the purpose of demonstrating a utility of the present invention, AISI type 304 stainless steel coiled strip samples with a thickness of 0.003 and 0.007 inch (0.076 to 0.178 mm) were chosen.

According to the present invention, synergistic results will be obtained through subsequent processing as described hereinafter by cleaning the stainless steel surface before the next step of annealing. The cleaning process not only helps reduce the oxide scale formation during subsequent annealing, but also renders the scale thickness more uniform during such annealing which is to be performed by induction heating techniques. The step of cleaning the stainless steel is indicated by reference numeral 2 by the application of a cleaning solution selected from the group of water and aqueous solutions of alkaline-based and acid-based compounds. The cleaning process to treat the stainless steel surfaces will be chosen to be best suited for cleaning steel in strip form by feeding the strip from an uncoiler to a cleaning station where the cleaning solution is provided in amounts sufficient to free the steel surface of contaminants that otherwise promote oxide scale formation when heating the steel substrate to annealing temperatures. The steel, when in a sheet form, is supplied to a cleaning station by a roller table or conveyor to allow the application of sufficient amounts of the wash material to free the steel surface from contaminants, as in case of the stainless steel in strip form.

After the cleaning operation, the stainless steel is passed through wipers or subjected to other measures to free the steel surface of residual cleaning solution and remove contaminant material. The stainless steel is then induction annealed, as indicated by the box identified by reference numeral 3. The stainless steel specimens included 0.003-inch gauge strips which were hot water-cleaned and 0.007-inch strips which were cleaned with aqueous alkaline; thereafter, both types of specimens were annealed by transverse flux induction heating to 2150 degrees Fahrenheit (1177 degrees Celsius), well below a 10 seconds time-to-temperature rate, at approximately 3 seconds time-to-temperature rate. The strip surface of both coils were observed to be very uniform in appearance after annealing.

It is within the scope of the present invention to provide that the steel is heated to a suitable annealing temperature, such as at least 1450 degrees Fahrenheit up to 2300 degrees Fahrenheit (788 to 1260 degrees Celsius) depending upon the chemical composition of the stainless steel being treated. Austenitic stainless steels may be heated from as low as about 1900 degrees Fahrenheit, and ferritic stainless steels from as low as 1700 degrees Fahrenheit within the scope of present invention.

It is also within the scope of the present invention to anneal by means of a process of transverse-flux induction heating of a kind indicated as being known to those skilled in the art from U.S. Pat. Nos. 4,054,770; 4,585,916; 3,444,346; 2,902,572; 4,678,883; and 4,824,536. For the purpose of the present invention, as disclosed, it is within the skill of the art to select an appropriate combination of impressed frequency and power, together with suitable use of shielding and shaping of polepieces in order to achieve, at a satisfactory rate of throughput, a satisfactory heating of the stainless steel sheet or strip involved, with the avoidance of the generation of uneven temperatures such as might cause cobbling or buckling.

Stainless steel sheet that has been cleaned and so heated may thereafter be either water-quenched or air-cooled. After transverse flux induction annealing treatment, the stainless steel product has an oxide scale with a thickness no more than approximately 1200 Angstroms, preferably, no more than 900, ideally no more than 800 Angstroms. The oxide thicknesses are smaller than the oxide thicknesses resulting from known transverse flux induction annealing operations with uncleaned steel surfaces; these generally range from 700 Angstroms (when annealing from 1850 degrees Fahrenheit) up to 1400 Angstroms (when annealing at 2057 degrees Fahrenheit).

Figure 2:
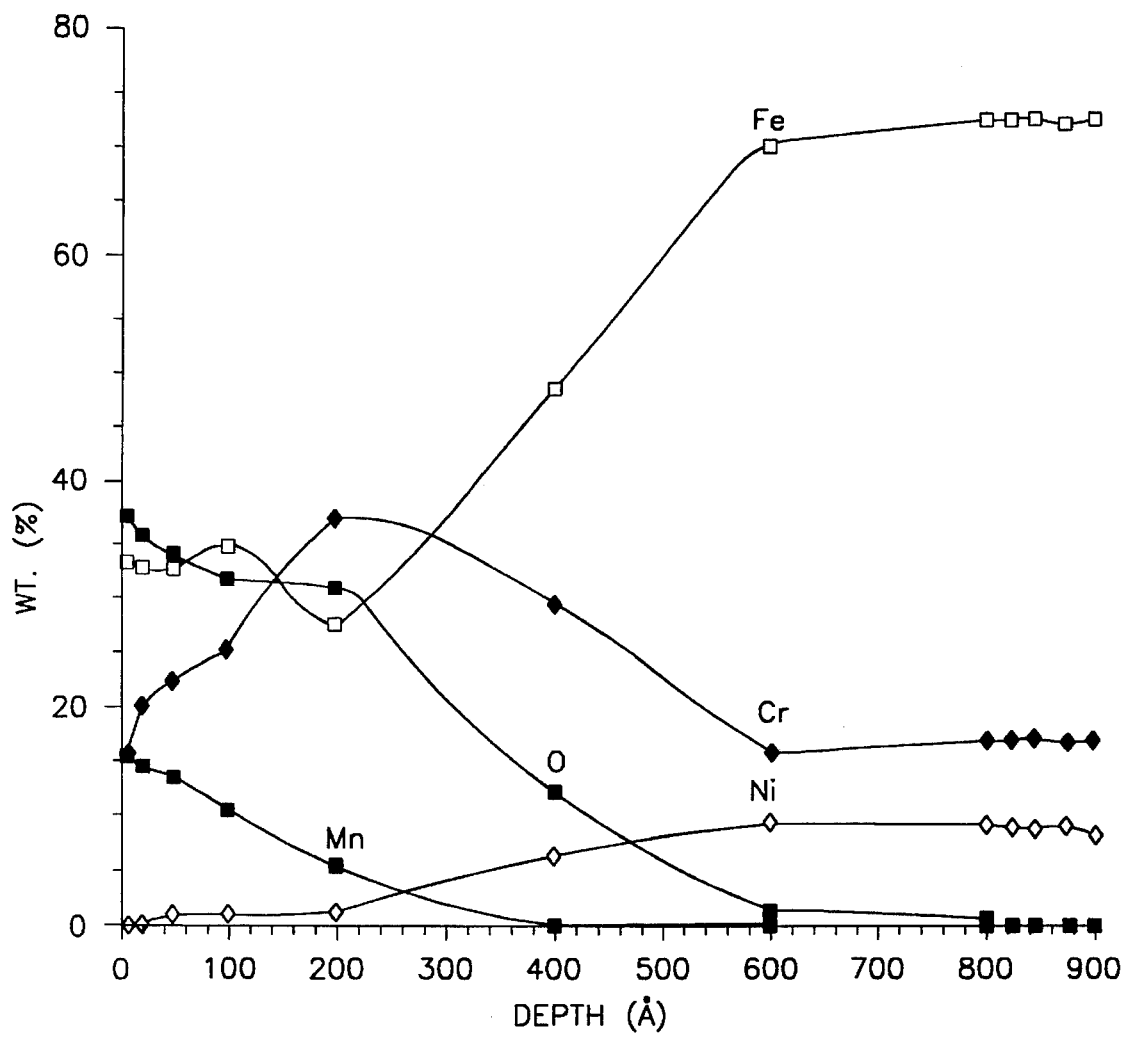
FIGS. 2 and 3 are graphs showing elemental depth profiles of the oxide scales for two different stainless steel samples.
Figure 3:
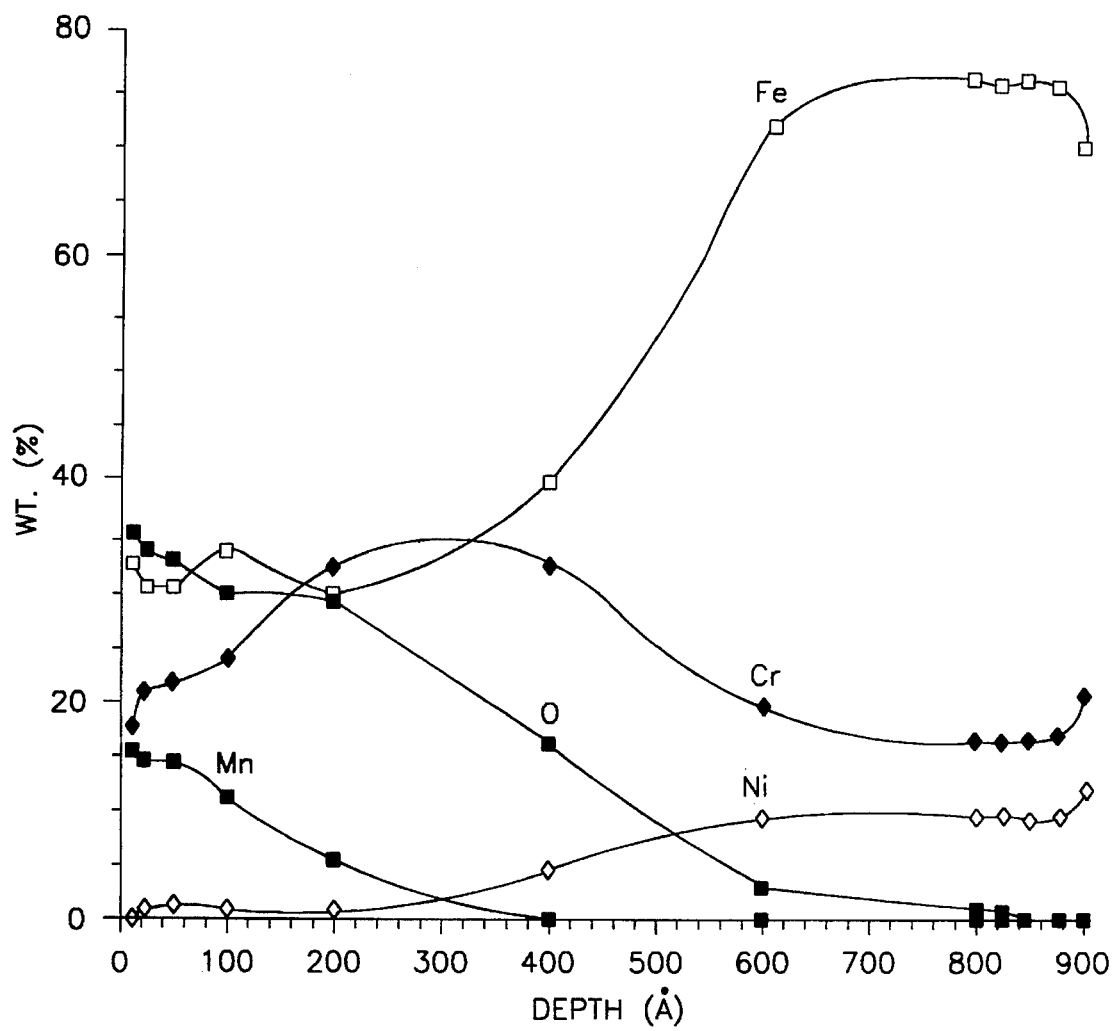
Figure 4:
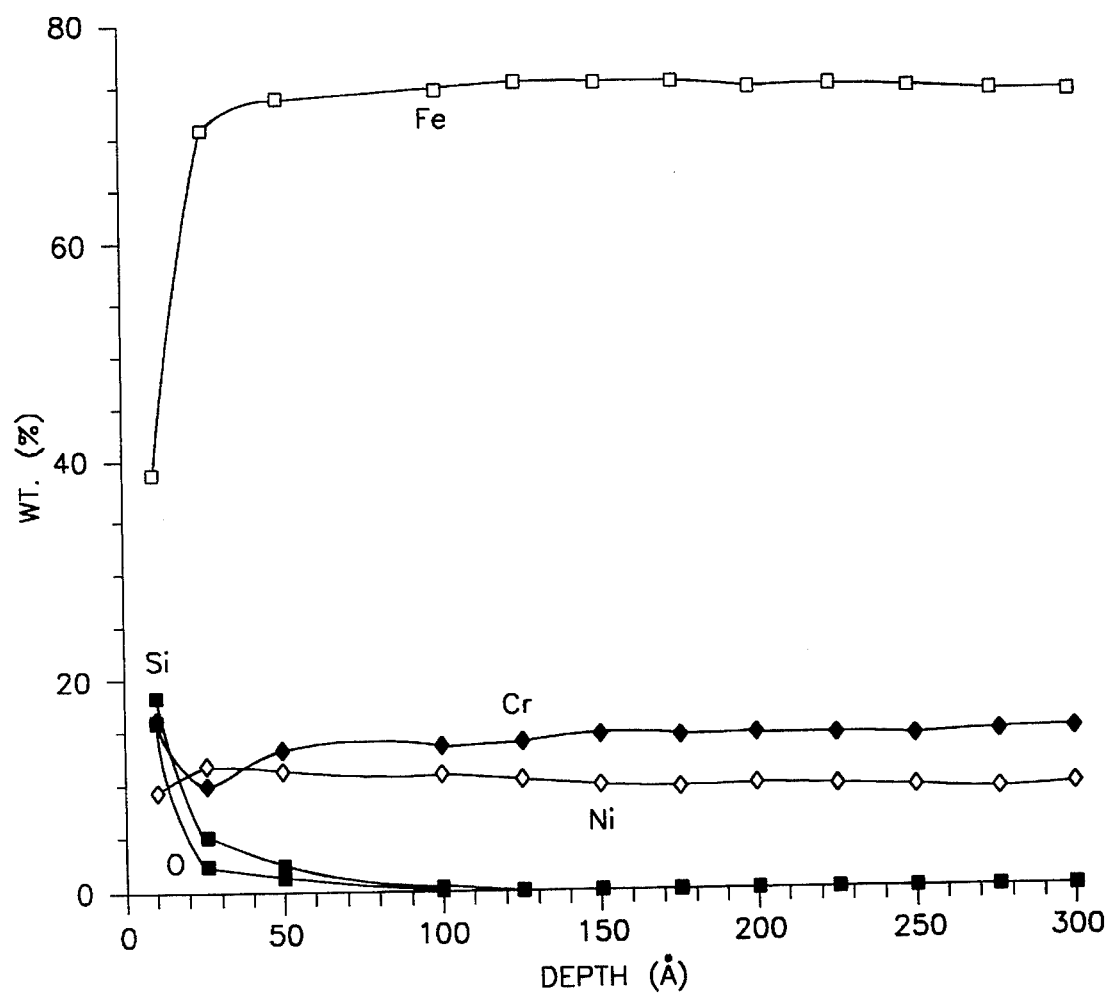
FIGS. 4–7 are elemental depth profiles of the descaled surfaces of different stainless steels provided by the present invention.
Figure 5:
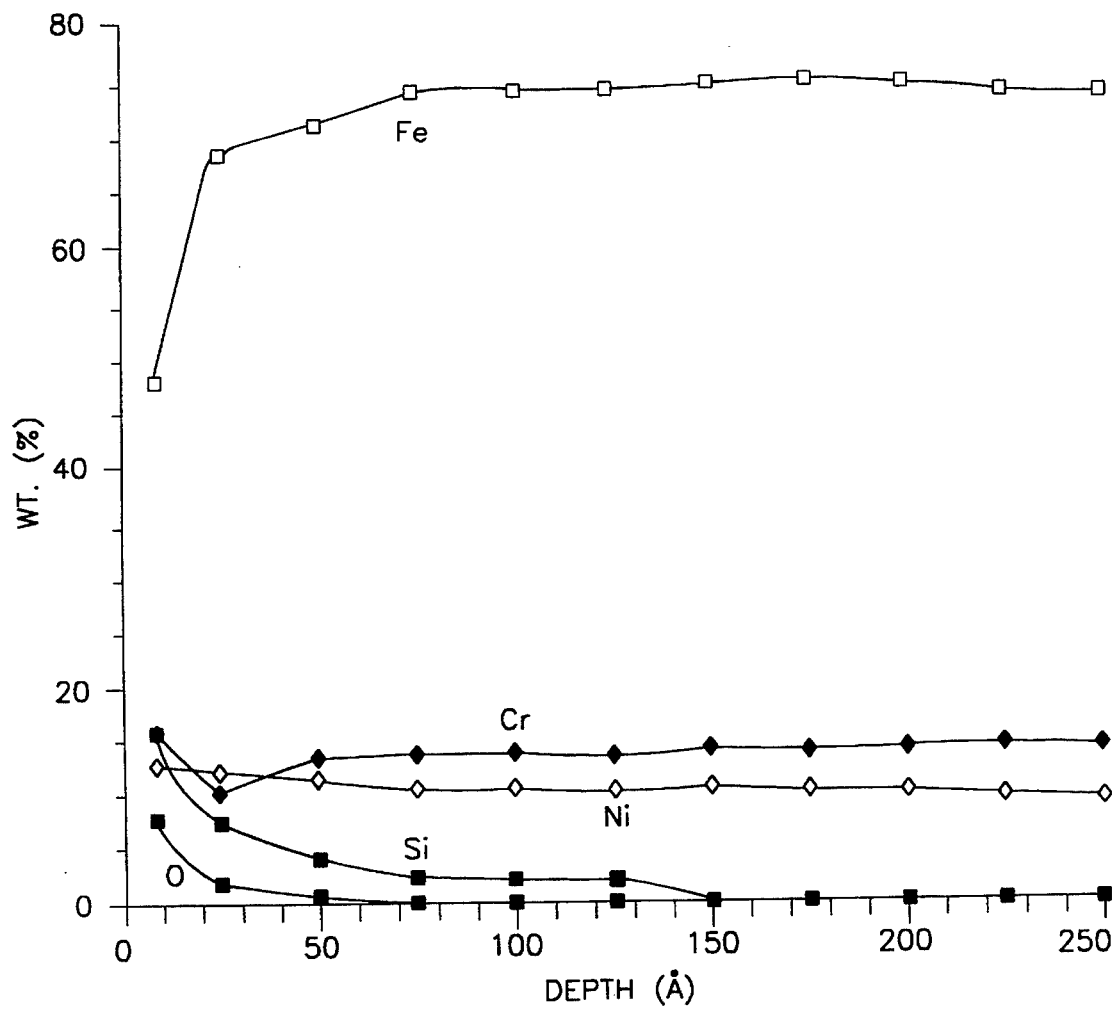
Figure 6:
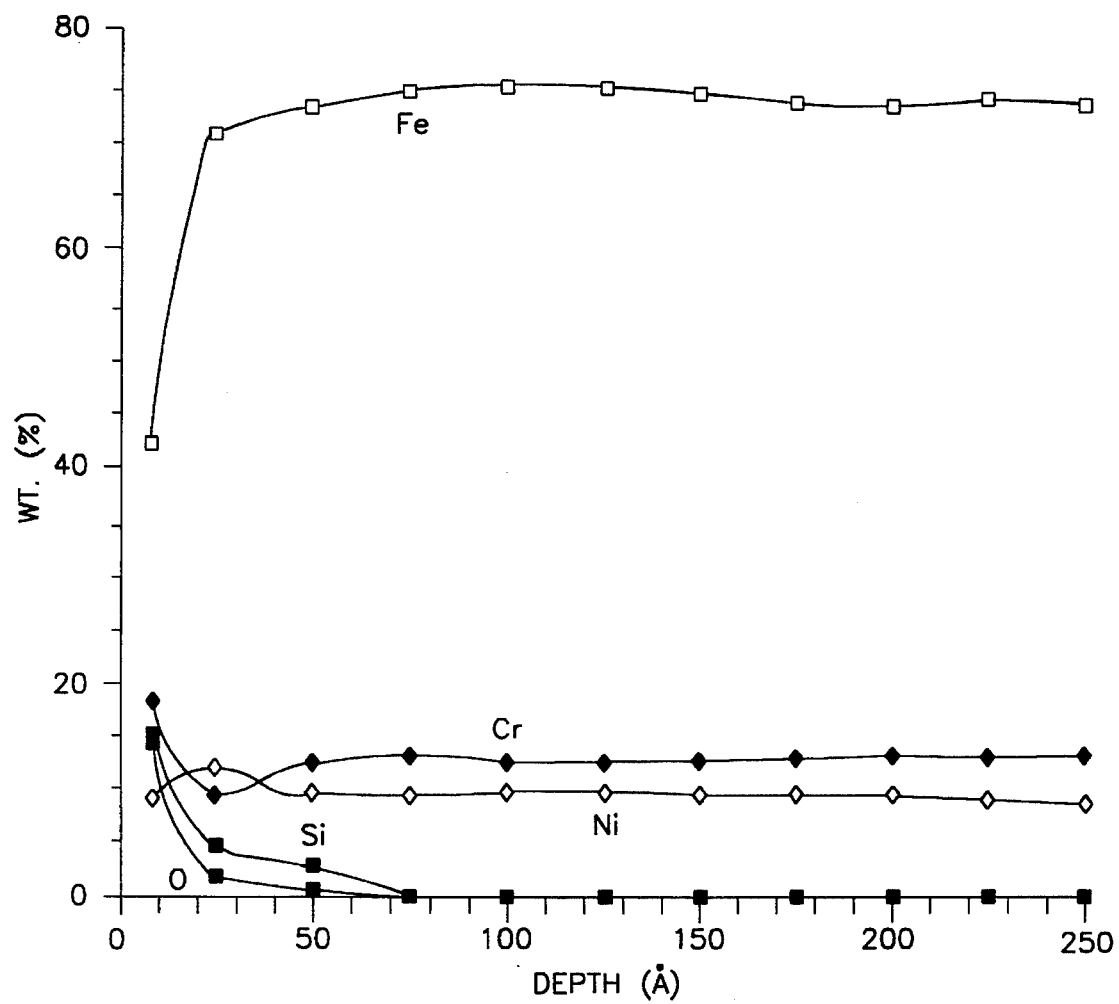
Figure 7:
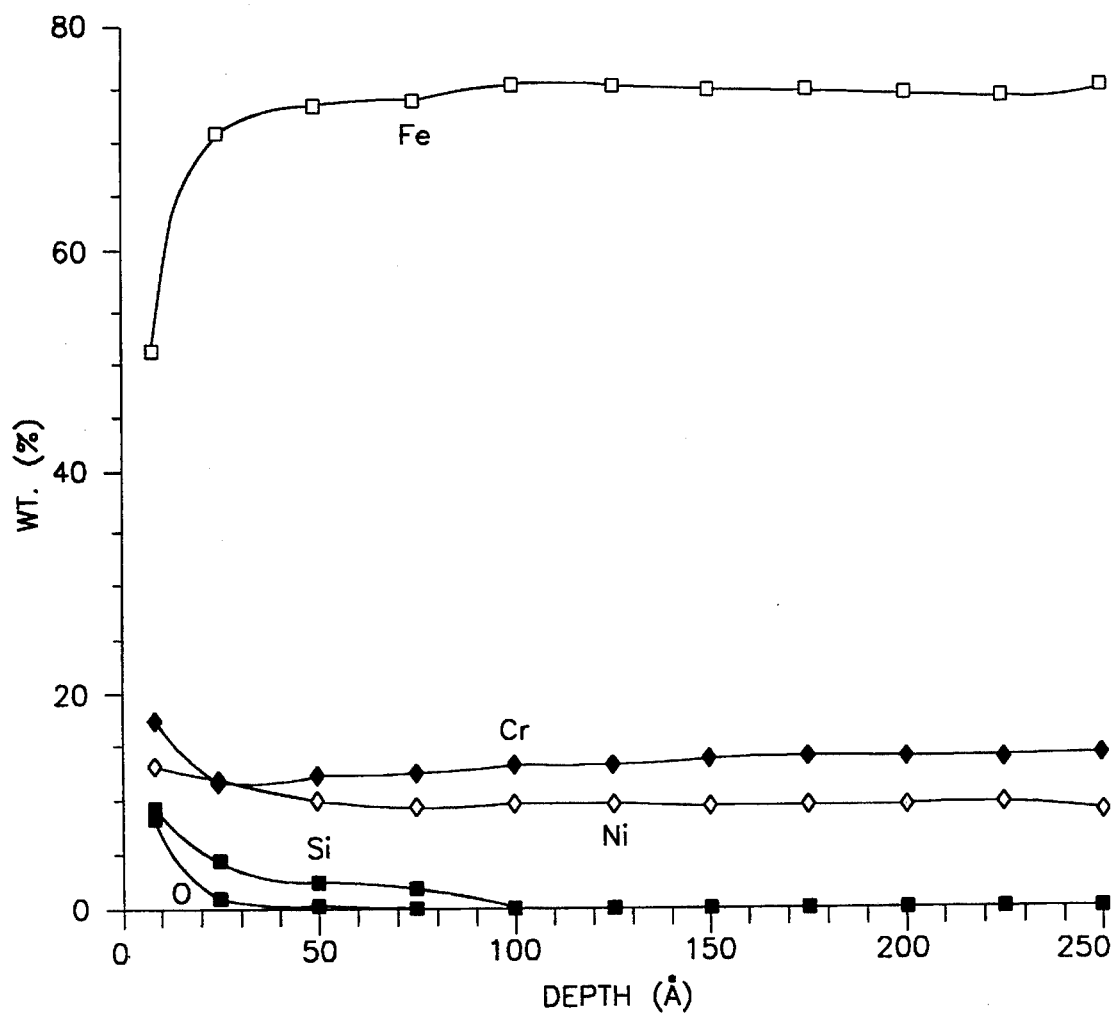

FIGS. 2 and 3 show the thicknesses and compositions of the oxide scales on the test specimens. More particularly, the graphs of FIGS. 2 and 3 show the elemental depth profiles determined by the Scanning Auger Microprobe (SAM) for Transverse Flux Induction Heating (TFIH) annealing at 2150 degrees Fahrenheit of samples of 0.003-inch and 0.007-inch thick type 304 stainless steel, respectively. As will be observed, the two elemental depth profiles shown in FIGS. 2 and 3 are almost identical and demonstrate that cleaning, either by hot water or by alkaline, effected a reduction in the thicknesses of the oxide films developed during subsequent annealing but the cleaning method did not significantly affect the elemental depth profiles of the oxides. The outer two-thirds of the oxides tend to be very rich in chromium, whereas the inner one-third, adjacent to the oxide-metal interface, tends to be rich in iron. At the outer one-third of the oxides, manganese enrichment is observed while the nickel content is essentially nil.

After TFIH annealing, the stainless steel is immersed in a bath of an aqueous electrolyte solution of at least one neutral salt from the group consisting of chloride, sulfate, and nitrate of an alkali metal or ammonium. Preferably, the electrolyte is sodium sulfate ranging from 7–25 percent, by weight, more preferably 15–20 wt. percent. In accordance with the present invention, the step of an electrolytic treatment in a bath of 15 to 25 weight percent of aqueous sodium sulfate maintained at a temperature above 150 degrees Fahrenheit (66 degrees Celsius) is indicated by reference 4 in FIG. 1. After the annealing operations were performed on the test coils, the scales which were developed on the strip surfaces were visually observed to be very uniform. The present invention enables the electrolytic treatment to be carried out at much lower current densities than heretofore known in the art, disclosed as being at least three amperes per square inch, in U.S. Pat. No. 4,824,836, for example.

It was discovered, surprisingly, that the synergistic step of cleaning the strip enabled a reduction of the current density within the range of 0.1 to 1.0 amps per square inch, preferably 0.2 to 0.5 amps per square inch. It was found that 0.2 amps per square inch required ten second treatment for complete descaling of the TFIH annealed materials. Descaling experiments were conducted for the TFIH annealed samples of both 0.003 and 0.007 inch thicknesses, using 20 percent by weight sodium sulfate in aqueous solution maintained at 160 degrees Fahrenheit. Descaling was also successful in ten-second treatments with current densities of one amp per square inch and 0.5 amp per square inch; these are, typically, the upper and lower limits of a conventional electrolytic sodium sulfate operating unit.

In addition to the lower density current available with the method of the present invention, the pH of the bath may range from 2.0 to 7.0, although a preferred range is 2.0 to 4.0. It is believed that the broad range is possible because of the thinner and more uniform oxide scales formed in the method of the present invention. Prior practices generally require an acidified electrolyte having lower pH values, such as 2.0 to 3.5.

The electrolyte temperatures are in the range of 150 to 185 degrees Fahrenheit (66 to 85 degrees Celsius), preferably 160 to 180 degrees Fahrenheit (71 to 82 degrees Celsius).

In FIGS. 4–7 there is shown Scanning Auger Microprobe (SAM) elemental depth profiles obtained on the electrolytic sodium sulfate-descaled samples, at 0.2 and 0.5 amps per inch squared for 0.003 inch gage and for 0.007 inch gage materials. The oxide film thicknesses range from 70 to 130 Angstroms for these samples, which is about the same as the thickness commonly measured on either pickled or bright annealed stainless steel strip surfaces.

Following the descaling operations, the test specimens were then subjected to a post-treatment step of a water wash and wet wipe, identified in FIG. 1 by reference numeral 5.

It is significant that the processing of the cold-rolled stainless steel specimens included successful descaling without the need and to the complete exclusion of acid pickling medium and thus the elimination of the attendant problems discussed hereinbefore when using such pickling techniques.

As was the objective, the present invention provides an annealing process which results in a thinner and more uniform oxide scale. The process has the benefit of requiring a less severe electrolytic process which uses lower current densities and less critical pH requirements. Such thinner and more uniform oxides are obtainable even when annealing at the higher temperatures required by TFIH as opposed to lower conventional annealing temperatures.

While the present invention has been described in connection with the preferred embodiments of the various figures, it is to be understood that other similar embodiments may be used or modifications and additions may be made to the described embodiment without departing from the scope of the present invention.

We claim:

1. The method of processing cold rolled stainless steel in the form of a strip or a sheet, said method comprising:

cleaning the surface of said stainless steel with a solution selected from the group consisting of water and an aqueous solution of alkaline and acid-based compounds in amounts sufficient to reduce oxide scale formation and to provide a more uniform scale thickness during subsequent annealing, thereafter;

subjecting said stainless steel to transverse-flux electrical-induction heating substantially uniformly across its width to an annealing temperature in the range of up to 2300 degrees Fahrenheit, thereby producing on said steel an oxide-scale having a relatively uniform thickness of about 1200 Angstroms or less; and electrolytically descaling said stainless steel by subjecting it to the action of a bath of an electrolyte of an aqueous solution of at least one neutral salt from the group consisting essentially of chloride, sulfate, and nitrate of an alkali metal or ammonium maintained at a temperature in excess of 150 degrees Fahrenheit and with the use of current density of about 0.1 to 1.0 amperes per square inch for a time sufficient to descale the steel substantially entirely.

2. The method of claim 1 including the further step of treating the electrolytically descaled stainless steel strip in a water rinse combined with wet wiping to yield an annealed and descaled stainless steel product.

3. The method of claim 2 wherein said annealed and descaled stainless steel product is wholly processed following cold rolling without the use of an acid-pickling treatment.

4. The method of claim 1 wherein the electrolyte is an aqueous solution of 7 to 25 weight percent sodium sulfate.

5. The method of claim 1 wherein the electrolyte temperature may range up to 185 degrees Fahrenheit.

6. The method of claim 1 wherein annealing the steel to a temperature of 1700 to 2300 degrees Fahrenheit.

7. The method of claim 1 wherein annealing the steel to a temperature of 1900 to 2300 degrees Fahrenheit.

8. The method of claim 1 wherein the current density ranges from 0.2 to 0.5 amps per square inch.

9. The method of claim 1 wherein the electrolyte pH ranges from 2.0 to 7.0.

10. A method for processing cold-rolled stainless steel in the form of a strip or a sheet, said method comprising:

cleaning the surface of said stainless steel with a solution selected from the group consisting of water and an aqueous solution of alkaline and acid-based compounds in amounts sufficient to reduce oxide scale formation with an attendant uniform scale thickness during subsequent annealing, thereafter;

subjecting said stainless steel to transverse-flux electrical-induction heating substantially uniformly across its width to an annealing temperature of 1700 to 2300 degrees Fahrenheit for approximately up to 10 seconds time-to-temperature rate;

electrolytically descaling said stainless steel by subjecting it to the action of a bath consisting essentially of an aqueous solution of 15 to 20 weight percent sodium sulfate maintained at a temperature of 160 to 180 degrees Fahrenheit and with the use of current density of 0.2 to 0.5 amperes per square inch for a time sufficient to descale the steel substantially entirely; and applying a water rinse combined with wet wiping to the electrolytically descaled stainless steel.

\* \* \* \* \*